Sept. 17, 1968    B. BOCKING ETAL    3,401,481
FISHING RODS
Filed June 1, 1965    4 Sheets-Sheet 3
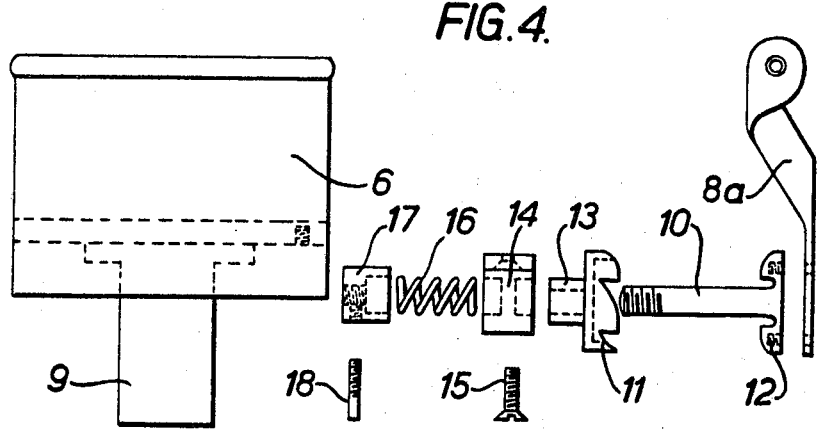
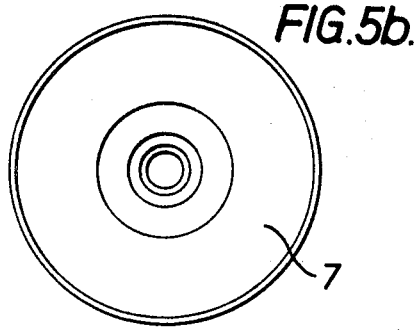
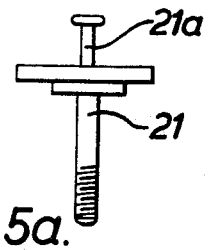
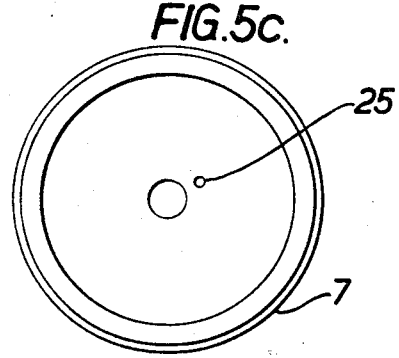
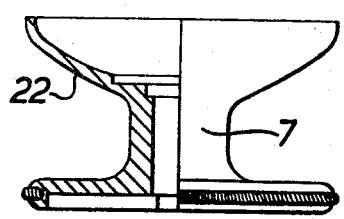
INVENTORS
BENJAMIN BOCKING
ROY GERALD CATCHPOLE
BY
ATTORNEY

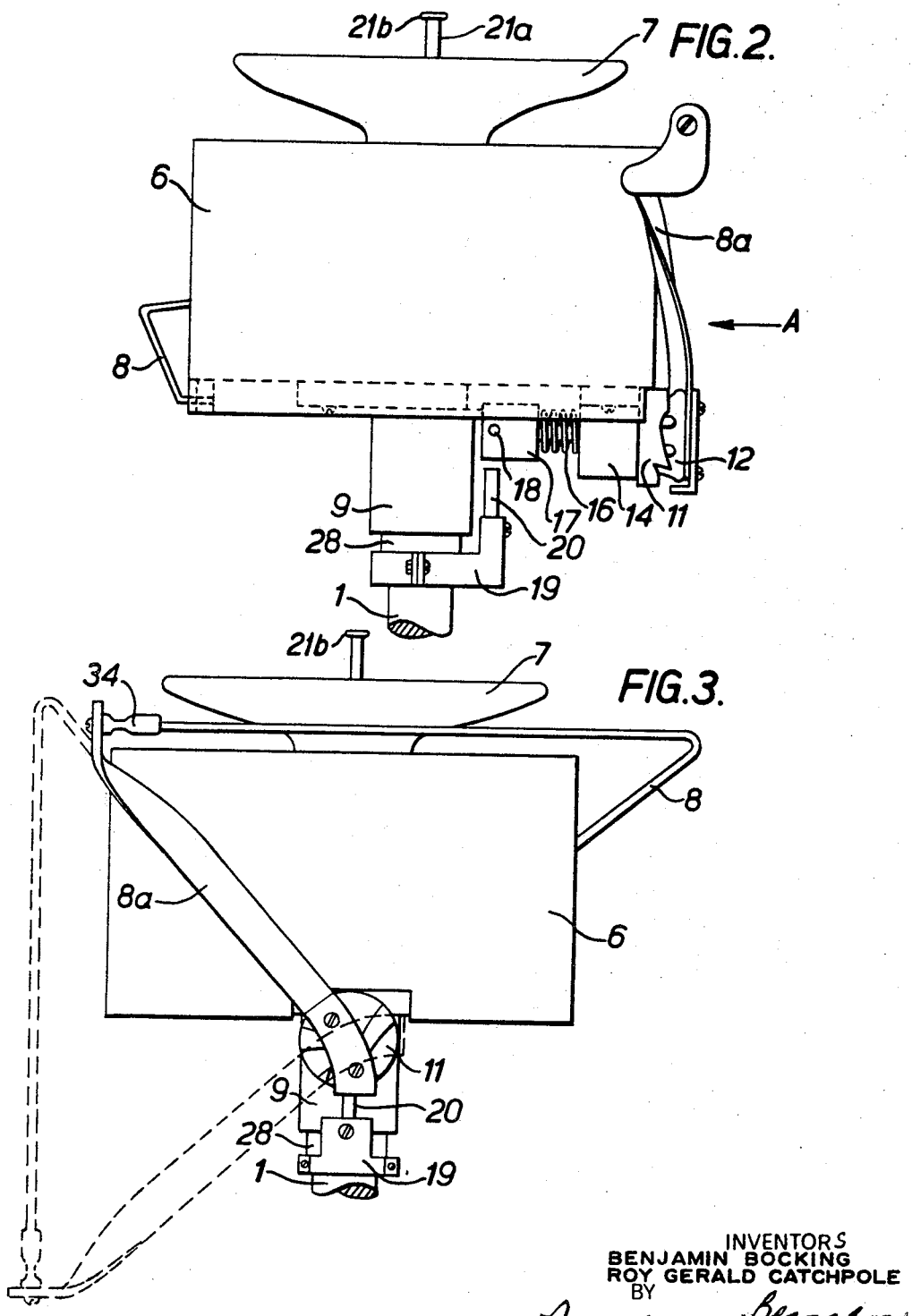

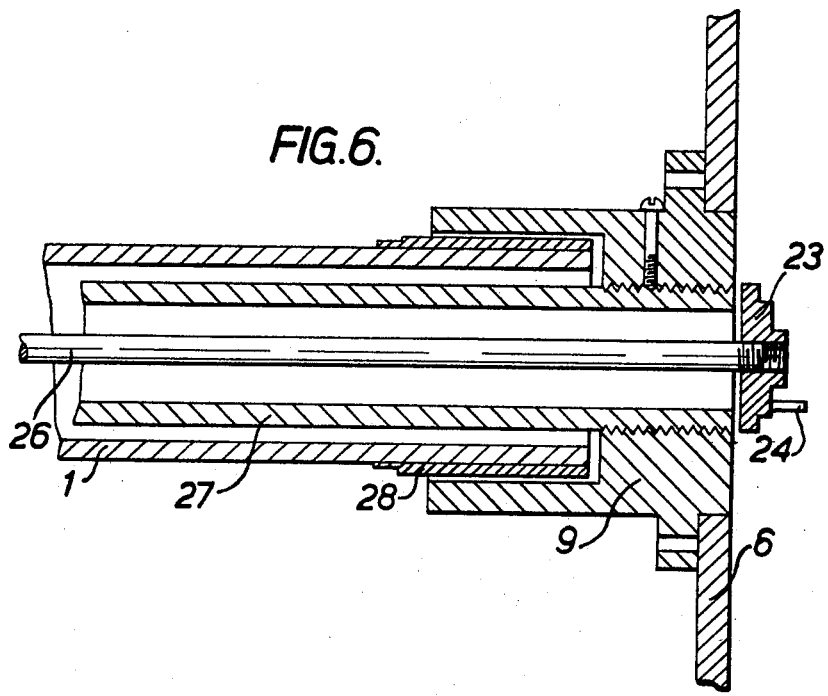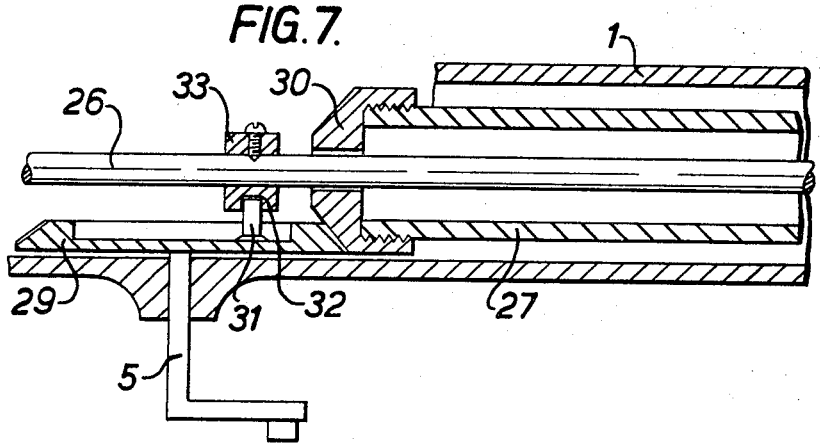

United States Patent Office 3,401,481
Patented Sept. 17, 1968

3,401,481
FISHING RODS
Benjamin Bocking, 109 Corton Road S., and Roy Gerald Catchpole, 13 Lorne Park Road, both of Lowestoft, England
Filed June 1, 1965, Ser. No. 460,427
Claims priority, application Great Britain, June 1, 1964, 22,550/64
6 Claims. (Cl. 43—20)

ABSTRACT OF THE DISCLOSURE

A line-throwing rod having a spool mounted at the free end thereof remote from the handle. The spool contains a bail arm for guiding the line thereon during rewinding. Coacting stop members automatically move the bail arm from a casting position into the rewinding position at the commencement of the rewinding operation.

---

The invention relates to line throwing devices such as fishing rods and the like, and has among its objects to increase the length of a cast that is possible with such a device.

According to the invention there is provided a line throwing rod in which a spool carrying the line is received within a cup at the free end of the rod, the cup or the spool being rotatable from the other or lower end of the rod to wind the line on to the spool.

Thus the line thrower may be adapted for fishing and may comprise two tubes coaxial with a central member, the cup being secured to the inner of the two tubes, means for rotating the inner of the two tubes, a bail arm for the cup, which bail arm is rotatable with the cup to wind the line around the spool which is secured to the central member, and means for axially reciprocating the central member.

It will thus be understood that the friction of the line with the rod or parts of the rod is reduced to a minimum.

The invention though primarily applicable to fishing rods of all kinds may also be used in the projection of life-lines to ships in distress and to other like means.

The invention is digrammatically illustrated by way of example in the accompanying drawings in which:

FIGURE 2 is a more detailed view of the upper end of the rod;

FIGURE 3 is a view on arrow A of FIGURE 2;

FIGURE 4 is an exploded view showing the bail arm operating mechanism;

FIGURES 5a, 5b and 5c are a part sectional elevation, a plan view and an underneath view, respectively, of a spool for a rod according to the invention;

FIGURE 6 is a sectional view showing the drive arrangement at the upper end of the rod, and FIGURE 7 is a sectional view showing the drive arrangement at the lower end of the rod.

Figure 1:
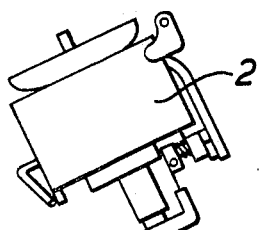
FIGURE 1 is a general view of a rod according to the invention.

Referring to the drawings a rod is formed of a tube 1, advantageously of stainless steel or aluminum alloy, and bears at the upper end a reel arrangement generally indicated at 2. Handles 3 and 4 of a diameter greater than the tube 1, for gripping the rod, are advantageously provided at the lower end of the rod and at a distance above the lower end of the rod, respectively.

A cranked handle 5 for operating the reel arrangement 2 is provided adjacent the lower handle 3.

The reel arrangement 2 comprises a spool cup 6, a spool 7 and a bail arm 8. The spool 7 is non-rotatably mounted but is reciprocated axially relative to the spool cup 6 when the cranked handle 5 is rotated. The spool cup 6 is rotatably mounted on the tube 1 by means of a bearing sleeve 9, which sleeve 9 is rotated with the spool cup 6 when the cranked handle 5 is rotated.

The bail arm 8 is secured on a shaft 10 and is movable between two positions, that is to say, the first position shown in solid lines in FIGURE 3, and a second position 90° anticlockwise from the first position, as shown in dotted lines in FIGURE 3, the positions being determined by coacting face cams 11, 12.

As shown in FIGURE 4 an arm 8a of the bail arm 8 is secured to the face cam part 12, which part is integral with the shaft 10. The other face cam half 11 has an extension 13, which may be secured within a bearing block 14. The bearing block 14 is flanged at its upper end and may be secured by screws 15 to the underside of the spool cup 6. A bore in the bearing block 14 receives a spring 16, the other end of which is received in a bore in a block 17. The shaft 10 passes through the face cam 11, the extension 13, the bearing block 14, the spring 16 and is secured in a screw threaded part of the block 17. The block 17 has a pin 18 projecting therefrom. Secured adjacent the bearing sleeve 9, is a clamp 19 having a pin 20 projecting upwardly therefrom. If the spool cup 6 is rotated in a clockwise direction as viewed from below, with the bail arm 8 in the dotted line position shown in FIGURE 3, then the pin 18 and the pin 20 will abut and the bail arm will be tripped into the solid line position shown in FIGURE 3, as explained hereinafter.

The spool 7 is provided with a flanged bolt 21 (FIGURE 5a) which bolt has an upstanding portion 21a having a lip 21b at its upper end. The spool 7 is formed with a curved taper 22 at the lower face of its upper flange, whereby fishing line wound around the reel can be pulled off over the upper flange 22 with the minimum of frictional resistance.

The spool 7 is clamped to a flange 23 (FIGURE 6) by means of the bolt 21 and is secured against rotation relative to the flange 23 by means of a pin 24 on the flange engaging a hole 25 in the underside of the spool.

The flange 23 is secured to a nonrotatable rod 26 which extends the whole length of the fishing rod. A drive tube 27 is provided around the rod 26 and is secured at its upper end by means of a locked screw thread to the bearing sleeve 9 which supports the spool cup 6. The outer tube 1 is provided with a reinforcing sleeve 28 which is a press fit on the tube 1 and has a portion of reduced diameter at its lower end around which the clamp 19 is secured.

The differences in diameter between the tubes 1 and 27 and the rod 26 have been exaggerated in the drawings to show more clearly the connections to the tubes and rod, also bearing bushings have not been illustrated but could be provided if required.

As shown in FIGURE 7 the cranked handle 5 is secured to and drives a bevelled gear wheel 29 which meshes with and drives a bevelled gear wheel 30 secured to the drive tube 27. A pin 31 secured to the gear wheel 29 engages a slot 32 in a block 33 secured to the rod 26, the slot 32 extending transversely to the longitudinal axis of the rod 26. Thus, rotation of the gear wheel 29 causes the pin 31 to slide transversely within the slot 32 while simultaneously reciprocating the rod 26 axially. The spool 7 is thus axially reciprocated relative to the spool cup 6.

In operation, to cast a fishing line with the rod, the line is wound around the spool 7 and the bail arm 8 is moved to the position 90° anticlockwise from that shown in solid lines in FIGURE 3. In this position the bail arm is out of the way and makes no contact with the fishing line. A loop of line adjacent the trace of the line is hooked over the projection 21a of the bolt 21 and the line is ready for casting.

The loop of line and the lip 21b on the projection 21a prevent the line from running off the reel during the back swing of the cast and also during the forward swing until the rod passes through the vertical position at which the loop slides over the lip on the projection 21a and the line is drawn off the reel by the momentum of the weight of the trace of the line. As soon as the line has ceased to run out the cranked handle 5 may be rotated, to rotate the spool cup 6, whereupon the downwardly extending pin 18 comes into abutting contact with the fixed upwardly extending pin 20. Upon continued rotation of cup 6, fixed pin 20 causes pin 18 and block 17 to rotate upwardly approximately 90° to permit pin 18 to pass over the pin 20. Rotation of block 17 also causes shaft 10, face cam 12 and bail arm 8 to rotate approximately 90°, the bail arm being moved from the casting position indicated in dotted lines (FIGURE 3) to the winding position indicated in solid lines. The bail arm 8 is held in the winding position by interengagement of the movable face cam 12 with the fixed face cam 11. Further rotation of the cranked handle 5 will rotate the spool cup whereby the line passes under the bail arm and winds around the spool 7. A grooved toggle 34 is provided where the bail arm 8 is secured to the arm 8a, the line running in the groove of the toggle 34 during reeling in.

We claim:

1. A line-throwing rod comprising:
 elongated rod means comprising a central rod and inner and outer tubular members concentric with said central rod, the inner tubular member being rotatable and the outer tubular member being nonrotatable;
 handle means secured to said outer tubular member adjacent one end of said rod means, the other end of said rod means constituting the free outermost end of said line-throwing rod with said free end being substantially spaced from said one end of said rod means;
 winding means mounted on said rod means adjacent said handle means for rotating the inner tubular member;
 reel means mounted at the free outermost end of said line-throwing rod with said reel means being substantially spaced from said winding means and said handle means, said reel means comprising a spool fixedly secured to said central rod and a cup-shaped member surrounding said spool and fixedly secured to said inner tubular member for rotation therewith;
 drive means associated with said winding means for axially reciprocating said central rod and said spool during rotation of said inner tubular member;
 a bail arm and means mounting said bail arm to said cup-shaped member for pivotal movement between a first position in which it is operative to wind the line around said spool when said cup-shaped member is rotated and a second position in which it is inoperative; and
 means for automatically moving said bail arm from said second position to said first position upon rotation of said cup-shaped member;
 said reel means and said bail arm thus being positioned at the extreme free outermost end of said line-throwing rod whereby said line is wound directly onto said spool.

2. A line-throwing rod comprising:
 rod means comprising a central rod and inner and outer tubular members concentrical with said central rod, the inner tubular member being rotable and the outer tubular member being nonrotatable;
 handle means adjacent one end of said rod means;
 winding means mounted on said rod means adjacent said handle means for rotating the inner tubular member;
 reel means mounted at the other end of said rod means and being substantially spaced from said winding means and said handle means, said reel means comprising a spool fixedly secured to said central rod and a cup-shaped member surrounding said spool and fixedly secured to said inner tubular member for rotation therewith;
 drive means associated with said winding means for axially reciprocating said central rod and said spool during rotation of said inner tubular member;
 a bail arm and means mounting said bail arm to said cup-shaped member for pivotal movement between a first position in which it is operative to wind the line around said spool when said cup-shaped member is rotated and a second position in which it is inoperative;
 said means mounting said bail arm to said cup-shaped member comprising detent means including first and second cam members having cooperating cam faces thereon, one of said cam members being fixedly secured to said cup-shaped member and the other of said cam members being fixedly secured to said bail arm, said cam members being mounted for relative axial and rotational movement, and resilient means biasing said cam members into engagement with each other to maintain said bail arm in either of said first and second positions; and
 means for automatically moving said bail arm from said second position to said first position upon rotation of said cup-shaped member.

3. A line-throwing rod comprising:
 rod means comprising a central rod and inner and outer tubular members concentrical with said central rod, the inner tubular member being rotatable and the outer tubular member being nonrotatable;
 handle means adjacent one end of said rod means;
 winding means mounted on said rod means adjacent said handle means for rotating the inner tubular member;
 reel means mounted at the other end of said rod means and being substantially spaced from said winding means and said handle means, said reel means comprising a spool fixedly secured to said central rod and a cup-shaped member surrounding said spool and fixedly secured to said inner tubular member for rotation therewith;
 drive means associated with said winding means for axially reciprocating said central rod and said spool during rotation of said inner tubular member;
 a bail arm and means mounting said bail arm to said cup-shaped member for pivotal movement between a first position in which it is operative to wind the line around said spool when said cup-shaped member is rotated and a second position in which it is inoperative;
 said means mounting said bail arm to said cup-shaped member comprising bearing means mounted on said cup-shaped member and shaft means fixed to said bail arm with said shaft means being rotatably mounted in said bearing means; and
 means for automatically moving said bail arm from said second position to said first position upon rotation of said cup-shaped member, said means including a first projection extending from said shaft means and a second projection fixed to the outer tubular member and adapted to contact said first projection when said bail arm is in the second position, rotation of said cup-shaped member causing contact between said projections whereby said shaft means is pivoted so as to move the bail arm to the first position.

4. A line-throwing rod comprising:
 rod means comprising a central rod and inner and outer tubular members concentric with said central rod, the inner tubular member being rotatable and the outer tubular member being nonrotatable;

handle means adjacent one end of said rod means;

winding means mounted on said rod means adjacent said handle means for rotating the inner tubular member;

reel means mounted at the other end of said rod means and being substantially spaced from said winding means and said handle means, said reel means comprising a spool fixedly secured to said central rod and a cup-shaped member surrounding said spool and fixedly secured to said inner tubular member for rotation therewith, said cup-shaped member having a bottom wall extending substantially transversely to said rod means;

drive means associated with said winding means for axially reciprocating said central rod and said spool during rotation of said inner tubular member;

a bail arm and means mounting said bail arm to said cup-shaped member for pivotal movement between a first position in which it is operative to wind the line around said spool when said cup-shaped member is rotated and a second position in which it is inoperative; and means for automatically moving said bail arm from said second position to said first position upon rotation of said cup-shaped member, said means including bearing means fixedly mounted on said bottom wall and a shaft member fixed to said bail arm and rotatably mounted within said bearing means, the longitudinal axis of said shaft being parallel to said bottom wall, a first pin fixed to said shaft and extending radially therefrom, a second pin fixed to said outer tubular member and extending substantially parallel to the longitudinal axis thereof toward said first pin and being adapted to contact said first pin when the bail arm is in the second position, rotation of said cup-shaped member when the bail arm is in the second position causing contact between said pins whereby said shaft is pivoted so as to move the bail arm to said first position.

5. A line-throwing rod as defined in claim 3, wherein the means mounting said bail arm to said cup-shaped member further includes a detent device comprising a first cam member fixed to said shaft and a second cam member fixed with respect to said bail arm and sleeved on said shaft, and spring means biasing said first and second cam members into cooperatig engagement with each other to maintain the bail arm in either the first or second positions.

6. A line-throwing rod as defined in claim 1, wherein the spool is provided with an axially extending projection on one end thereof, said projection having a radial lip thereon, said lip being effective to prevent a loop of line placed over said projection from leaving said projection until after the rod passes through the vertical plane during casting of the line.

References Cited

UNITED STATES PATENTS

| 713,633 | 11/1902 | Hall | 43—20 |
| 2,628,444 | 2/1953 | Oak | 43—20 |
| 3,084,885 | 4/1963 | Hornbostel | 43—20 X |

FOREIGN PATENTS

| 242,593 | 1/1963 | Australia. |
| 1,094,682 | 12/1954 | France. |

SAMUEL KOREN, *Primary Examiner.*

D. J. LEACH, *Assistant Examiner.*